United States Patent [19]

Pollack

[11] Patent Number: 5,361,083
[45] Date of Patent: Nov. 1, 1994

[54] DATA INPUT DEVICE AND METHOD

[75] Inventor: Jordan Pollack, Columbus, Ohio

[73] Assignee: Robicon Systems, N.J.

[21] Appl. No.: 46,467

[22] Filed: Apr. 12, 1993

Related U.S. Application Data

[63] Continuation of Ser. No. 686,900, Apr. 16, 1991, abandoned.

[51] Int. Cl.⁵ .............................................. H01H 25/00
[52] U.S. Cl. ...................................... 345/169; 341/20; 200/6 A; 400/485
[58] Field of Search ...................... 340/706, 709, 711; 341/20, 21; 200/6 A, 52 R; 345/169, 168, 172; 400/485

[56] References Cited

U.S. PATENT DOCUMENTS

| | | | |
|---|---|---|---|
| 3,824,354 | 7/1974 | Anderson et al. | 341/20 |
| 3,833,765 | 9/1974 | Hilborn et al. | 341/34 |
| 4,028,695 | 6/1977 | Saich | 340/365 R |
| 4,520,240 | 5/1985 | Swindler | 340/709 |
| 4,543,562 | 9/1985 | Ny | 341/22 |
| 4,584,443 | 4/1986 | Yaeger | 340/365 R |
| 4,680,577 | 7/1987 | Straayer et al. | 340/711 |
| 4,727,357 | 2/1988 | Curtin et al. | 340/365 P |
| 4,737,980 | 4/1988 | Curtin et al. | 379/97 |
| 4,755,634 | 7/1988 | Pepper, Jr. | 178/18 |
| 4,761,522 | 8/1988 | Allen | 400/485 |
| 4,783,645 | 11/1988 | Goldwasser et al. | 340/365 R |
| 4,791,408 | 12/1988 | Heusinkveld | 340/365 R |
| 4,831,359 | 5/1989 | Newell | 341/5 |
| 4,833,446 | 5/1989 | Eilam et al. | 400/489 |
| 4,859,100 | 8/1989 | Carlson | 400/715 |
| 4,897,649 | 1/1990 | Stucki | 341/22 |
| 4,917,516 | 4/1990 | Retter | 340/710 |
| 4,931,781 | 6/1990 | Miyakawa | 340/706 |
| 4,971,465 | 11/1990 | Hashimoto | 400/489 |

OTHER PUBLICATIONS

Kowalski & "Semi-Captive Keyboard"; Xerox, Diclosure Journal & vol. 1, No. 2, Feb. 1976; p. 85.

Truelson & "Single-Key Cursor Control"; IBM Technical Disclosure Bulletin; vol. 26, No. 7B Dec. 1973, pp. 3746-3747.

"Speed Keyboard for Data Processor" by Keeley IBM Technical Disclosure Bulletin vol. 23 No. 2 Jul. 1980.

"Compact Computer Keyboard"; IBM Technical Disclosure, Bulletin & vol. 27 No. 10A Mar. 1985; pp. 5640-5642.

*Primary Examiner*—Ulysses Weldon
*Assistant Examiner*—Gin Goon
*Attorney, Agent, or Firm*—Allan Jacobson

[57] ABSTRACT

A data input device and method for producing signals corresponding to symbols, comprises: at least one manually actuatable switch having a home state and manually actuatable from the home state to one of a set of first states and manually actuatable from the set of first states to one of a set of second states including the home state. A first signal corresponding to a transition from the home state to a selected one of the set of first states is produced and a second signal corresponding to a transition from the selected one of the set of first states to a selected one of the set of second states is produced. An output signal representing one symbol is produced in response to the first and second signals.

30 Claims, 20 Drawing Sheets

| Shift State | Key Value | Finger | | | |
|---|---|---|---|---|---|
| | | Index | Middle | Ring | Pinky |
| Lower | 1 | v | e | r | b |
| | 2 | <CR> | q | w | z |
| | 3 | j | o | c | k |
| | 4 | s | i | p | <DEL> |
| | 5 | d | a | n | g |
| | 6 | f | l | u | x |
| | 7 | m | y | t | h |
| Upper | 1 | V | E | R | B |
| | 2 | <CR> | Q | W | Z |
| | 3 | J | O | C | K |
| | 4 | S | I | P | <DEL> |
| | 5 | D | A | N | G |
| | 6 | F | L | U | X |
| | 7 | M | Y | T | H |
| Control | 1 | <SYN> | <ENQ> | <DC2> | <STX> |
| | 2 | <CR> | <DC1> | <ETB> | <SUB> |
| | 3 | <LF> | <US> | <ETX> | <VT> |
| | 4 | <DC3> | <HT> | <DLE> | <DEL> |
| | 5 | <EOT> | <SOH> | <SO> | <BEL> |
| | 6 | <ACK> | <FF> | <NAK> | <CAN> |
| | 7 | <CR> | <EM> | <DC4> | <BS> |
| Numeric | 1 | 7 | 8 | 9 | 0 |
| | 2 | <CR> | <BS> | <FS> | <GS> |
| | 3 | ; | : | - | / |
| | 4 | 4 | 5 | 6 | <DEL> |
| | 5 | . | , | { | } |
| | 6 | <HT> | <ESC> | ~ | : |
| | 7 | 1 | 2 | 3 | | |
| Punct | 1 | ' | ( | ) | _ |
| | 2 | <CR> | <BS> | <RS> | <US> |
| | 3 | + | * | = | ? |
| | 4 | $ | % | & | <DEL> |
| | 5 | < | > | [ | ] |
| | 6 | <HT> | <ESC> | ^ | @ |
| | 7 | ! | " | # | \ |

Figure 9.

18 State Key Switch

1) Up, Center (Home)
2) Up, Forward
3) Up, Back
4) Up, Left
5) Up, Right
6) Up, Forward, Left
7) Up, Forward, Right
8) Up, Back, Left
9) Up, Back, Right 10) Down, Center
11) Down, Forward
12) Down, Back
13) Down, Left
14) Down, Right
15) Down, Forward, Left
16) Down, Forward, Right
17) Down, Back, Left
18) Down, Back, Right

DATA INPUT DEVICE AND METHOD

This application is a continuation of application Ser. No. 07/696,900, filed Apr. 16, 1991 now abandoned.

FIELD OF THE INVENTION

The invention relates generally to a data input method and a data input device such as typewriter and data-entry keys and keyboards, keyboards operable with a single hand, keyboards with multi-character, multi-directional keys, and keyboards miniaturized for use with pocket-sized data-processing devices.

BACKGROUND OF THE INVENTION

Standard keyboards for data-entry of text include an array of momentary switches, usually in 4 rows and 10 or 12 columns, with the center of each key usually spaced about ¾ inches away from its neighbors. Almost all full-sized keyboards are arranged in the QWERTY pattern originating with Shole's (1860) patent, except for keyboards made for a small following of Dvorak's (1936) patent.

The conventional keyboard is designed for use by people with two hands on full-sized typewriters. When adapted for use by one-handed persons, or miniaturized, this type of keyboard does not perform well.

In miniaturized keyboards in use with text-based calculators and pocket computers, the keys and their spacing are reduced to about ½ inch or less, resulting in the operator's speed of typing being greatly diminished. The operator of such a keyboard loses the advantageous use of 8 or 9 fingers and primarily utilizes only the memory of where particular letters are located. This accounts for the popularity of miniature keyboards in which the letters are arranged alphabetically.

In the prior art, the only principal to switch-array keyboards is chording keyboards. For chording keyboards, fingers must operate in parallel or simultaneously for each signal sent. Two patents relating to this type of keyboard are Volnak (U.S. Pat. No. 4,467,321) for a 10-key chording keyboard, and Enfield & Rainey (U.S. Pat. No. 4,443,789), for a 6-key chording keyboard with mnemonic coding.

The history of typewriting has seen several patents on multiple-character-per-key keyboards, for example, Hesh (U.S. Pat. No. 2,532,228), Samuel (U.S. Pat. No. 3,633,724) and Zapp (U.S. Pat. No. 4,081,068). These patents are in the field of full-sized two-handed keyboards, and furthermore use lateral motion of the fingers. Kroczynski (U.S. Pat. No. 4,517,424) describes a hand-held control device which uses non-lateral motions, but does not describe any system for typing or text entry.

Finally, the instant invention relates to pocket-sized devices with full-screen displays. Lapeyre's (U.S. Pat. No. 4,324,976) appears to be directed to rear-facing keyboards. The instant device, however, can be attached to the side of a display.

SUMMARY OF THE INVENTION

The present invention is a data input method and device preferably comprising a miniature one-hand keyboard for rapid data-entry of alphabetic, numeric, graphic, and control characters and means for producing signals corresponding to the characters on the basis of a state transition or sequence. The invention overcomes disadvantages of the prior art keyboards and has many features not disclosed in the prior art. The five aspects mentioned below as well as others will become apparent through the disclosure:

1. The instant keyswitches are not describable by the prior art pole/throw terminology.
2. The use of multiple state transitions for encoding distinct characters has not been disclosed in the prior art.
3. The keyboard arrangement of keys herein for corresponding positions have the letters for those positions arranged in easily memorized "words". The different arrangements have no overlapping letters and are uniquely well-suited to quick mastery of the keyboard.
4. The logic for the instant method of queuing by reservation to provide rollover between fingers has not been disclosed in the prior art.
5. The overall construction of the keyboard to allow lateral attachment to full-screen display pocket-sized data-processing equipment has not been disclosed in the prior art.

In accordance with the present invention a data input device for producing signals corresponding to symbols is provided, comprising:

at least one manually actuatable switch having a home state and manually actuatable from the home state to one of a set of first states and manually actuatable from the set of first state to one of a set of second states including said home state;

means for producing a first signal corresponding to a transition from the home state to a selected one of the set of first states and for producing a second signal corresponding to a transition from the selected one of the set of first states to a selected one of the set of second states; and output means for producing an output signal representing one symbol in response to the first and second signals.

The device preferably comprises a plurality of the one switches constituting symbol switches and further comprises a control switch for producing a third signal and wherein the output means comprises means for producing the output signal representing one symbol in response to first and second signals from one symbol switch and the third signal from the control switch. The output means further comprises queuing means receptive of the first and second signals from the symbol switches keys for determining the order of the production of output signals based upon the order of receipt of the first signals therefrom.

In one preferred embodiment of this invention, a six-position keyswitch is provided and positioned for each of four fingers. That is, there is a keyswitch for each finger. These keyswitches do not move laterally, but only rock forward and back and move up and down. Through the use of an encoding mechanism for each character, not as a position, but as a path, each keyswitch can send seven (instead of five) characters using the six positions. Together, the four fingers can send 28 characters.

The thumb is equipped with a combination multidirectional shift mechanism and space-bar. In one embodiment, the thumb can shift or modify the 28 characters produced by the six-position keyswitch five ways as well as produce a space-character. Thus, the keyboard can produce a total of 141 characters, more than enough for the standard ASCII code and for most alphabets of the world. Through the use of a queuing system, all five fingers can overlap operations, thereby permitting rapid bursts of typing by rolling keys in the same direction. Furthermore, the alphabetic characters produced by the four keyswitches are approximately arranged into groups of words with no overlapping letters. Once these groups of words are committed to memory, touch-typing can be carried out.

One object of the invention is to allow the rapid typing or data-entry of at least the full ASCII set of 128 characters with the fingers of a single hand.

Yet another object of the invention is to permit typing by touch only without the fingers being removed from their home positions.

A still further object of the invention is to provide rollover between the operation of independent fingers, thereby gaining performance advantages over chording keyboards.

Still another object of the invention is to provide a typing system easily learned by memorizing a group of words with no overlapping letters.

Another object of the invention is to enable the construction of full-screen display pocket-sized text-intensive data-processing equipment such as word-processors, teleprocessing terminals, or symbolic calculators. This objective is achieved by the invention in that it can be attached laterally, rather than frontally, to such equipment.

Yet another object of the invention is to provide a hand-held device to be used in conjunction with head mounted video displays.

Still another object of the invention is to use the keyboard alone or in conjunction with other devices as an aid to the handicapped. One embodiment is as a replacement keyboard for a personal computer for a person who prefers or must use a single hand. Another embodiment is a pocket-sized deaf teletype (TTD) with full-duplex full-screen communications. Still another embodiment is to use the invention in conjunction with an electromechanical braille-display for the blind.

A further object of this invention is to allow data-entry to be done in conjunction with "pointing" by means of a pointing or positioning device such as a tablet, light-pen, trackball, or mouse. The operator can control a pointing device with one hand while typing with the other. Furthermore, an embodiment of this invention includes the keyboard being integrated with a positioning device to construct a combined point-and-type device.

BRIEF DESCRIPTION OF THE DRAWINGS

These and other objects and embodiments of the present invention may be understood by referring to the following drawings:

FIG. 9 is one of many possible arrangements of key paths for defining characters according to this invention.

DETAILED DESCRIPTION OF PREFERRED EMBODIMENTS

Various embodiments of the invention may be described in three dimensions: The "width" is the number of keyswitches; the "height" is the number of characters each keyswitch is capable of encoding; and the "depth" is the number of shifting states. The preferred embodiment is 4 by 7 by 5 according to these dimensions: four keyswitches, each of which can send seven characters, times five shifted states. Other organizations can be used, such as 8 by 7 by 2, 2 by 45 by 2, 2 by 17 by 5, 8 by 4 by 4, 6 by 6 by 4, or 5 by 7 by 4. For purposes of exposition, the construction of one embodiment will be carried through in detail, but it is understood that the scope and spirit of this invention is not limited to this 4 by 7 by 5 embodiment.

Figure 1:
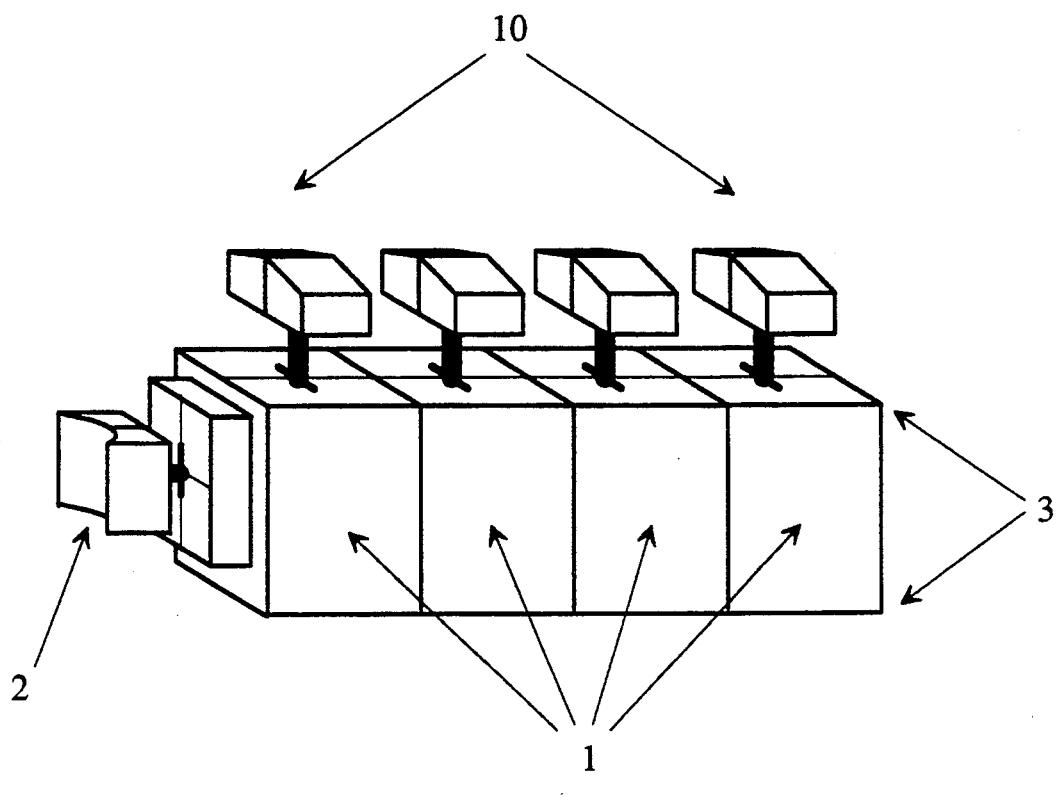
FIG. 1 is a diagrammatic representation of one embodiment of a keyboard according to the present invention.

FIG. 1 shows one embodiment of the invention. It includes four complex finger keyswitches 1, one for each finger, and a shift and space assembly thumb keyswitch 2 to be operated by the thumb and which includes space bar 13. The housing 3 for the entire device 20 is dependent on the use it will be put to.

Figure 2:
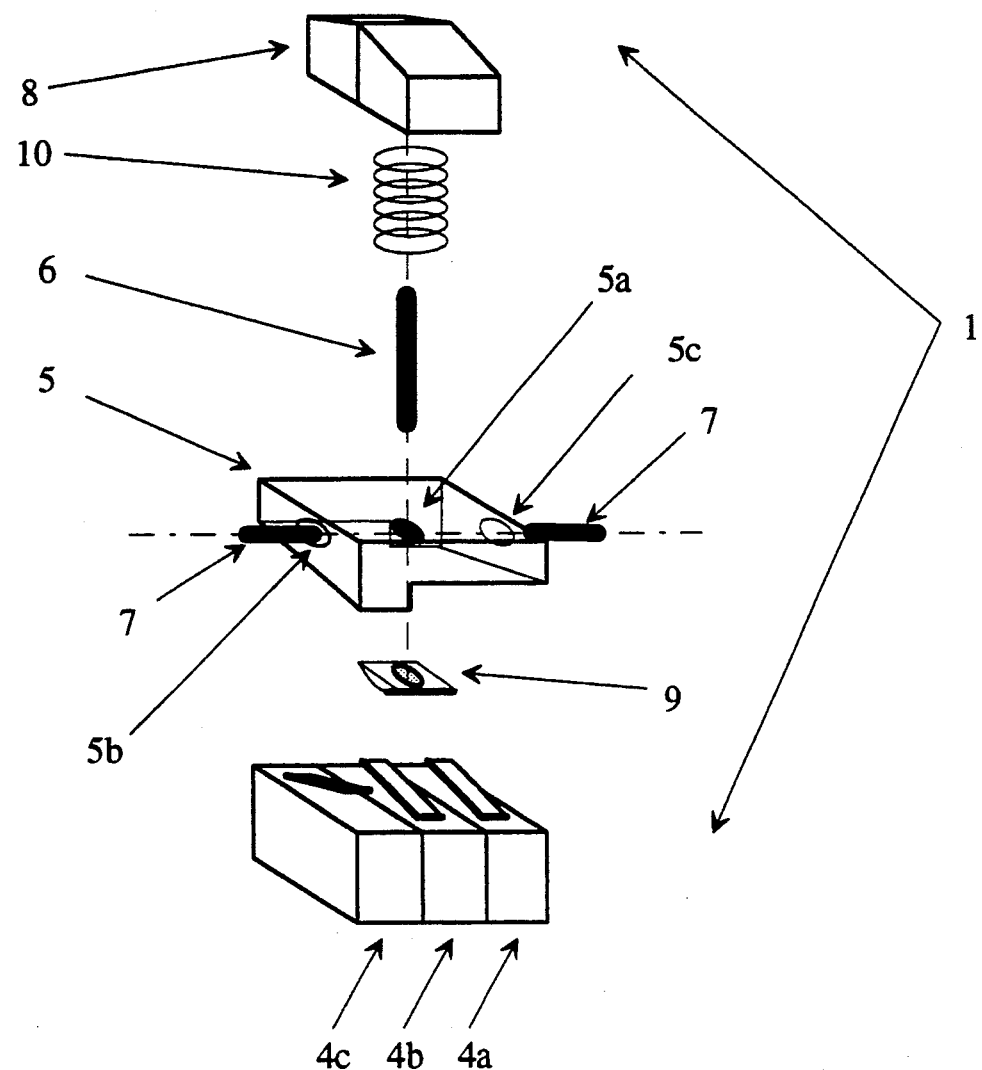
FIG. 2 is a exploded view of a diagrammatic representation of one of the inner keyswitches shown in FIG. 1.

FIG. 2 shows a detailed exploded view of one embodiment of the finger keyswitch 1 which is usually replicated four times in FIG. 1. In this embodiment, three miniature lever switches 4a–c are used with an assembly comprised of a platform 5 and a post 6. The platform can tilt forward and backwards on a two-piece countersunk axle 7 in holes 5b and 5c, and by tilting actuates either of the two outside switches 4a and 4c. The center post 6 passes through the center hole 5a of the platform 5, and is connected at its top to a pyramid-shaped keytop 8. The center post is connected at its bottom to a semicylindrical retainer 9. The vertical movement of the center post 6 is limited upwardly by the retainer 9 and limited downwardly by activating the center switch 4b. The home position, which is top and center, of the entire keyswitch 1 is maintained by a spring 10 around the center post 6 between the keytop 8 and the platform 5, as well as by springs (not shown) within the lever switches 4a, 4b and 4c.

The pyramid-shaped keytop 8 permits the actuation of the keyswitch 1 by the top joint of each finger rather than requiring the fingertip, and the semicylindrical retainer 9 allows the platform to tilt while the center post is pressed down. This construction allows the keyswitch 1 two independent degrees of freedom UP/DOWN and FORWARD/CENTER/BACK, and thus six different positions all together. While a pyramid shape is shown, it is contemplated that other shape keytops, including ones which capture the fingertip, can be used.

Figure 3:
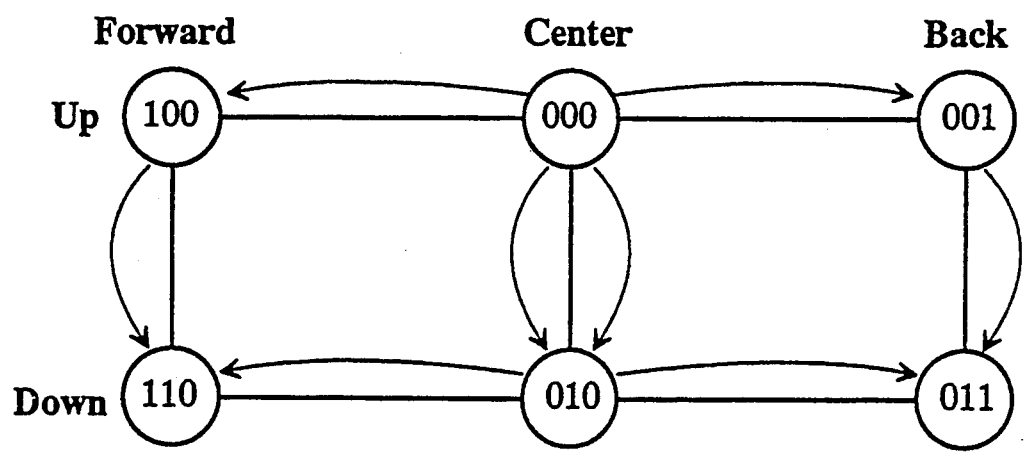
FIG. 3 shows the six positions of the finger keyswitch shown in FIG. 2.

FIG. 3 diagrammatically shows the six positions of the keyswitch 1. The positions correspond to the states of the three switches and each switch 4a-c has two states, "0" and "1". The home position, center and up, has all of the switches open and is (000). Forward and up has one switch closed and is (100) while forward and down has two switches closed and is (110). The other switch positions shown in FIG. 3 are similarly indicated.

Since keyswitch 1 construction can be manufactured by the same principles as any other type of electrical switch, there are many embodiments of the keyswitch 1 possible, including, but not limited to: other mechanical arrangements, and the use of capacitive means, membrane means, mercury means, optoelectric and various magnetic concepts and arrangements such as reed relays and hall-effect switches.

Figure 4:
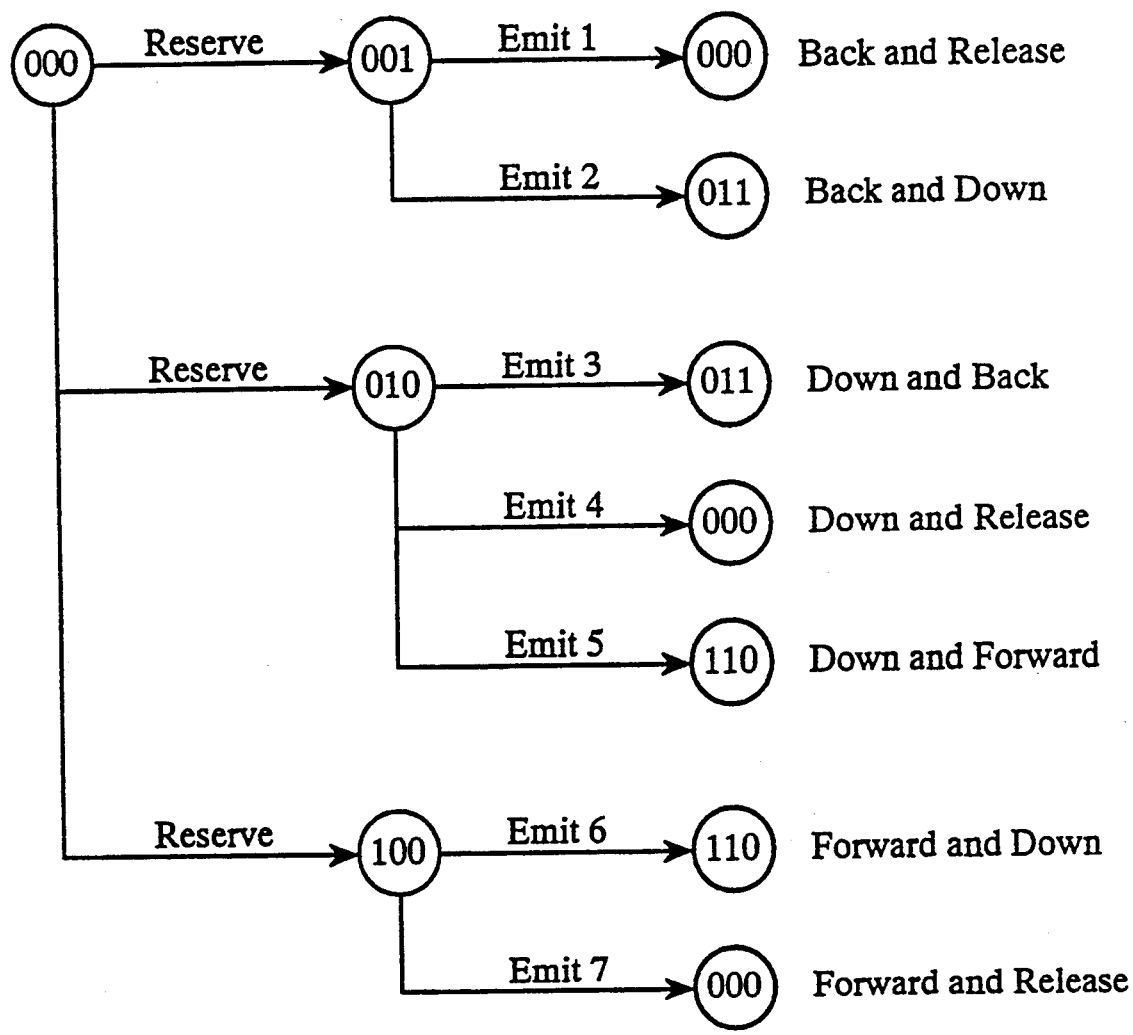
FIG. 4 shows a simplified version of a finite state machine (FSM) associated with the finger keyswitch shown in FIG. 2.
Figure 5:
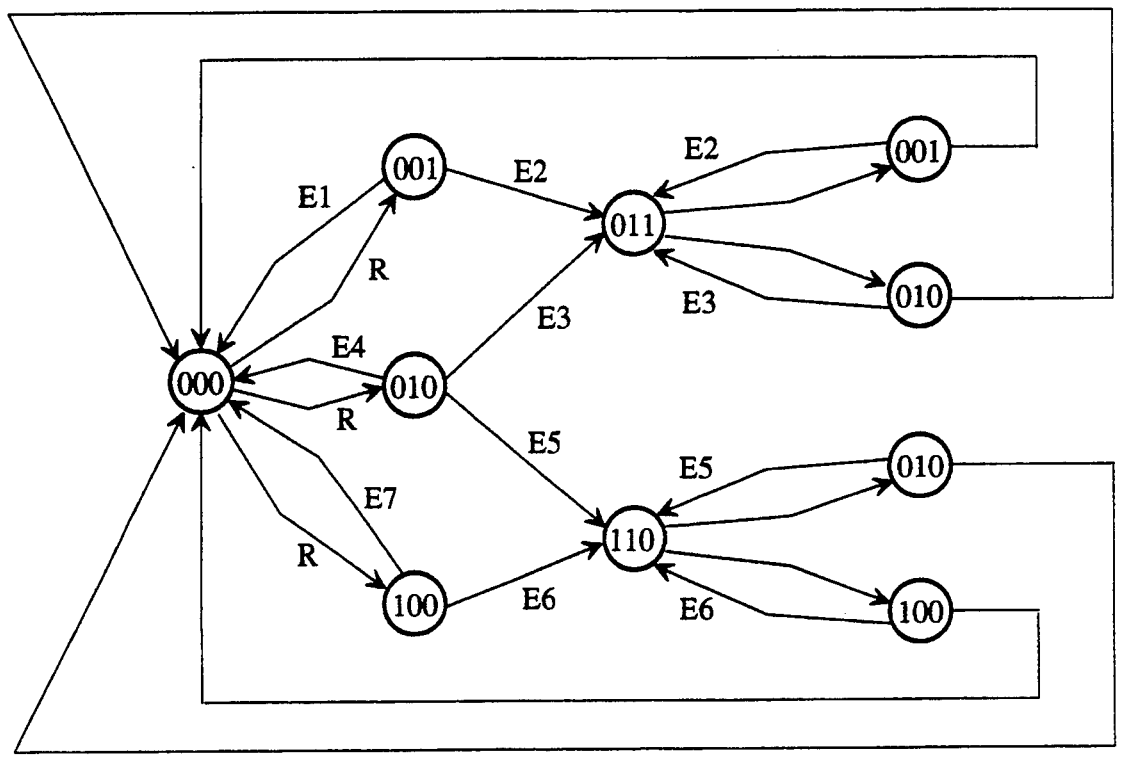
FIG. 5 is a state transition diagram for the finger keyswitch shown in FIG. 2.

Although the keyswitch 1 is capable of 6 positions, a novel encoding technique allows each keyswitch 1 to send 7 characters instead of only 5, by utilizing paths or transitions rather than positions. FIG. 4 shows a scheme used for encoding each keyswitch path. In FIG. 4, two changes in the position of the keyswitch 1 are required to transmit a character. The first change in position "reserves" a place in a queue of characters being transmitted. It is the second change in position which identifies the character and causes a signal to be "emitted" or produced. The term "emit" is used in FIG. 4 to show the character 1-7 which are emitted. FIG. 5 shows a state transition diagram relating to FIG. 4.

In FIG. 5, the states are depicted as three-bit binary numbers in circles which indicate the open (0) or closed (1) state of each lever switch as indicated in FIG. 3. Every possible transition is included, shown as arrows between states, and the corresponding actions are indicated by the following labels on the arrows: R for "reserve" and E1 through E7 for "Emit character 1" through "Emit character 7".

FIG. 5 also shows a "quick repeat" feature. For example, after the keyswitch 1 is moved from (000) to (001) and then to (011) to emit E2, movement to (001) and back to (011) will repeat E2, saving some finger motion. This is also possible for E3, E5 and E6 as shown in FIG. 5. Furthermore, it is contemplated that holding a keyswitch in the same position for a second, without other keyboard activity, will operate as an auto-repeat feature such as for spacing, tabbing and backspacing, as in conventional keyboards.

Reserving a place in a queue of characters being transmitted enables "rollover". One finger can "start" to produce one character and another finger can "start" to produce a different character without disturbing the queuing of the first character. This "rollover" from producing one character to producing a second character allows rapid typing because no interference between the characters occurs. The queuing feature will be described hereinafter.

Figure 6:
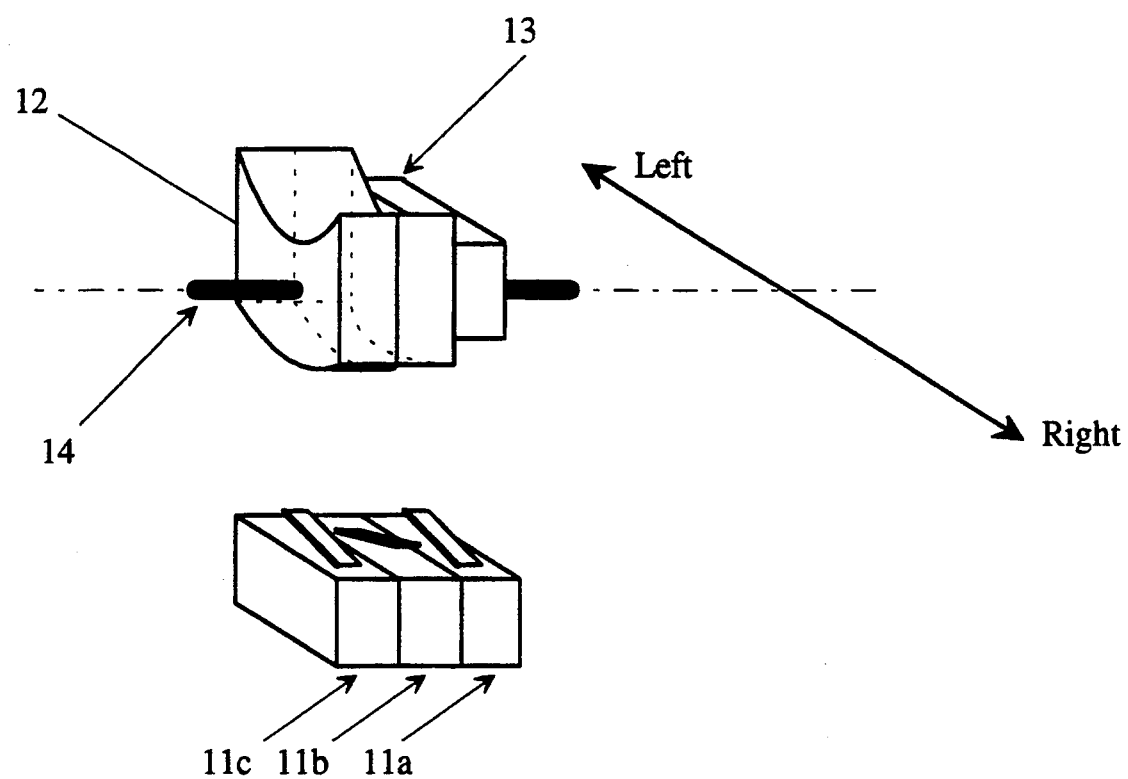
FIG. 6 is a view of a diagrammatic representation of the thumb keyswitch shown in FIG. 1.
Figure 7:
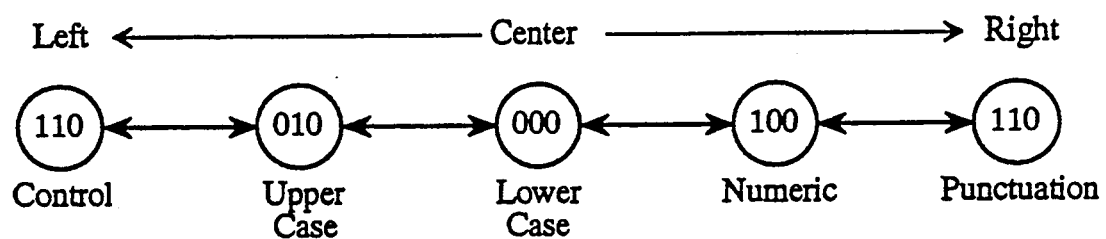
FIG. 7 is a simplified version of a finite state machine (FSM) associated with a portion of the thumb keyswitch shown in FIG. 6.

FIG. 6 shows a view of one embodiment the thumb keyswitch 2 to control 5-way shifting and a space-bar. Three lever switches 11a-c are used for the states shown in FIG. 7. The thumb keyswitch 2 has two parts. A curved block 12 is used to activate two (11b and 11c) of the three switches 11a-c when block 12 is rolled to either side. The block 12 is cam-shaped so that when it is rotated by a thumb around axle 14 it first closes one switch and then a second. The order of these closures depends on the direction of rotation. Thus, the states shown in FIG. 7 are obtained.

A rectangular block 13 with an elliptical hole (not shown) is used to activate the remaining switch 11a. The block 13 is operated independently of the block 12 and is generally referred to as the "space bar" herein despite its broad function. The space bar can produce a space and can also provide a "lock" of the mode of the block 12. Both blocks 12 and 13 are constrained in their movement by the axle 14. As with the keyswitch 1, there are many mechanical/electrical/optical/magnetic embodiments anticipated for the shift/space mechanism as well.

There are numerous embodiments of the state control, which include, at least, prefix-coding, where the shift-state is used only by the next character; momentary, where the shift-state is defined as long as it is held (typical for QWERTY keyboards); and locked, where a shift-state is defined until it is undone (as in a caps-lock switch). The use of prefix-coding is advantageous for capitalization and punctuation, while a locked coding is useful for typing a sequence of capital letters or numbers.

Figure 8:
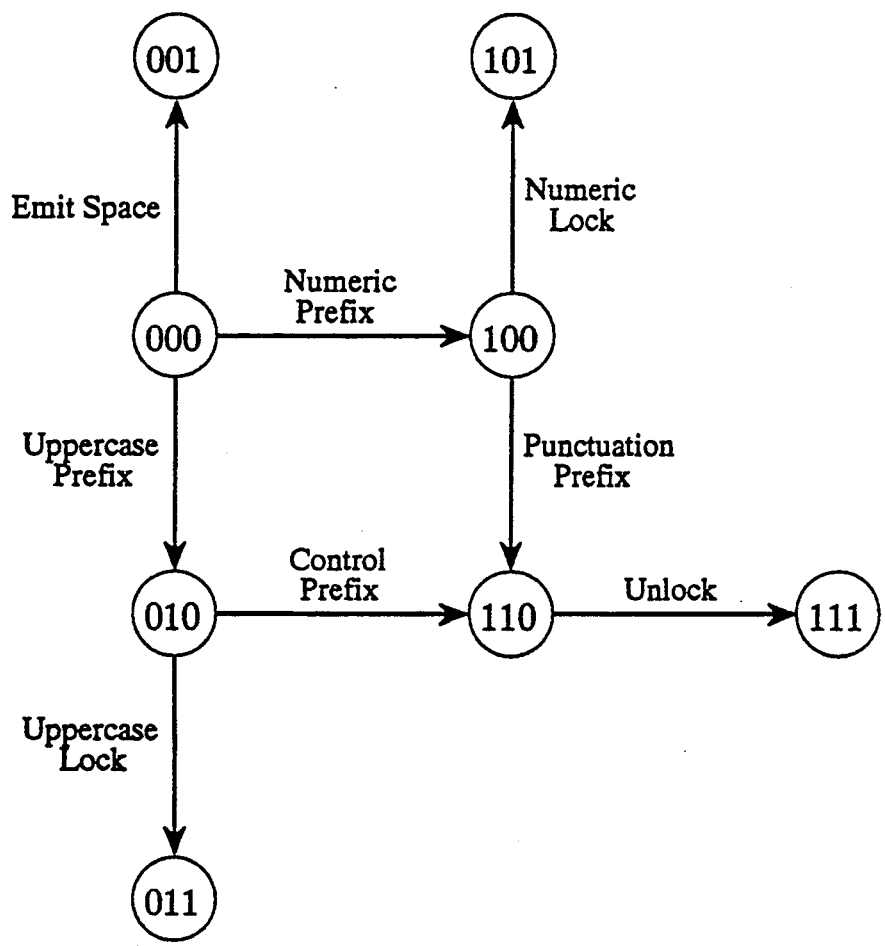
FIG. 8 is a state transition diagram for the thumb keyswitch shown in FIG. 6.

FIG. 8 shows, using a similar notation as FIG. 5, a preferred embodiment of a finite-state machine which interprets the actions of the control keyswitch 2. The state of each switch is represented by "0" or "1". The actions on the arrows represent signalling actions useful to transmit different classes of characters from the keyboard: LOWER-CASE, UPPER-CASE, CONTROL, NUMERIC, and PUNCTUATION. Because of the rollover scheme described below, the preferred embodiment uses prefixed and locked control, rather than momentary control. Engaging the space bar will either produce a space (001) or produce a "lock".

Given the 7 characters which can be emitted by each of the finger keyswitches, the 4 finger keyswitches which are provided, and the 5 shift-states which can be controlled by the thumb keyswitch 2, the embodiment herein is capable of sending 140 different characters as well as a space character. FIG. 9 shows a table for one embodiment of the invention to produce the 128 ASCII characters which are standard for data-processing applications.

It has been determined that the organization of letters produced by the keyswitches 1 into groups of words with no overlapping letters is mnemonically valuable in learning to use the invention, or any other character-arrayed keyboard. The group of 7 words, VERB, QWZ (as "quiz"), JOCK, SIP, DANG, FLUX, and MYTH is only one possible embodiment of this novel organization. FIG. 9 shows the relationship between these words and the corresponding paths of the keyswitches. The selection of the arrangements for producing characters by the keyswitches 1 takes into account a variety of factors. Convenience for memory is a desirable aspect, as well as the location of both frequent characters and frequent multiple-character sequences. It is desirable to have frequent letters such as "e" and "s" produced by highly mobile fingers, and it is also desirable to have common bigrams such as "th" and "er" in the same position on adjacent keyswitches 1 to take advantage of rollover.

Figure 10:
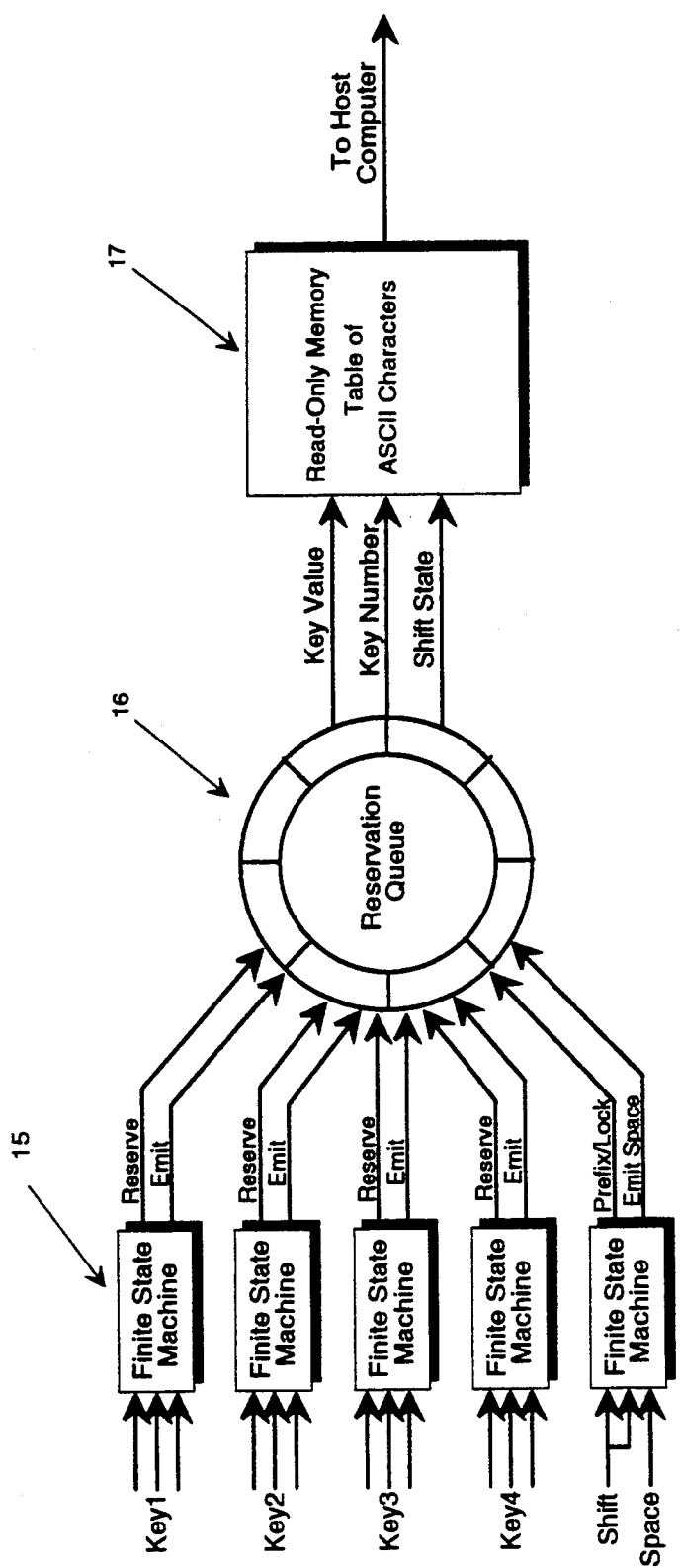
FIG. 10 depicts a block diagram for an encoder with a reservation queue for achieving rollover according to this invention.

FIG. 10 is a block diagram of an embodiment of an encoder for this invention. The keys are connected to finite-state machines 15 which send commands to a reservation queue 16, which in turn coordinates the actions of all the switches and sequentially sends characters to the host data-processing device. The encoder uses a read-only memory (ROM) 17 to convert from shift-state, key-number and key-value information into ASCII characters. This encoder can be embodied in discrete logic, in custom integrated circuitry, in firmware for a micro-controller, or as software in the host itself.

The reservation queue is a queue which services several suppliers of inputs, and accepts both reservations and emissions from those suppliers. When a reservation is received, an opening is left open waiting for an emission. When an emission is received, the queue is checked for an open reservation from that supplier. If no reservation is found, the emission enters at the end of the queue. If a reservation is found, the emission fills that opening.

The instant mechanism coordinates rollover in the invention. As specific sequences of two state transitions are necessary to emit a character by one of the keyswitches, when a switch moves from home position (000) to, say, (100), it is unknown whether character 6 or 7 ultimately is to be sent, and therefore a reservation is made. If in the process, a different keyswitch is actuated to emit character 3, (by the path 000-010-011), that character is queued behind the reservation for the first character. When the first keyswitch is moved from (100) to (110) or (000) the reservation is replaced with the character value 6 or 7, respectively. In this way, very rapid bursts of characters can be sent with almost simultaneous finger movements. Thus, "rollover" is achieved from the action of one finger to the action of another finger before the first finger has completed its sequence for emitting a character.

For example, to type "VERB", the fingers are sequentially rolled forward and then released in any order. To type "JORDAN" as another example, the first and second keyswitches are pressed down in order, and then the first three keyswitches are simultaneously rolled forward and then released; then the first three keyswitches are pressed down in order and then simultaneously pulled back and released. This form of rollover provides the invention with significant typing speed advantages over chorded keyboards.

Figure 11:
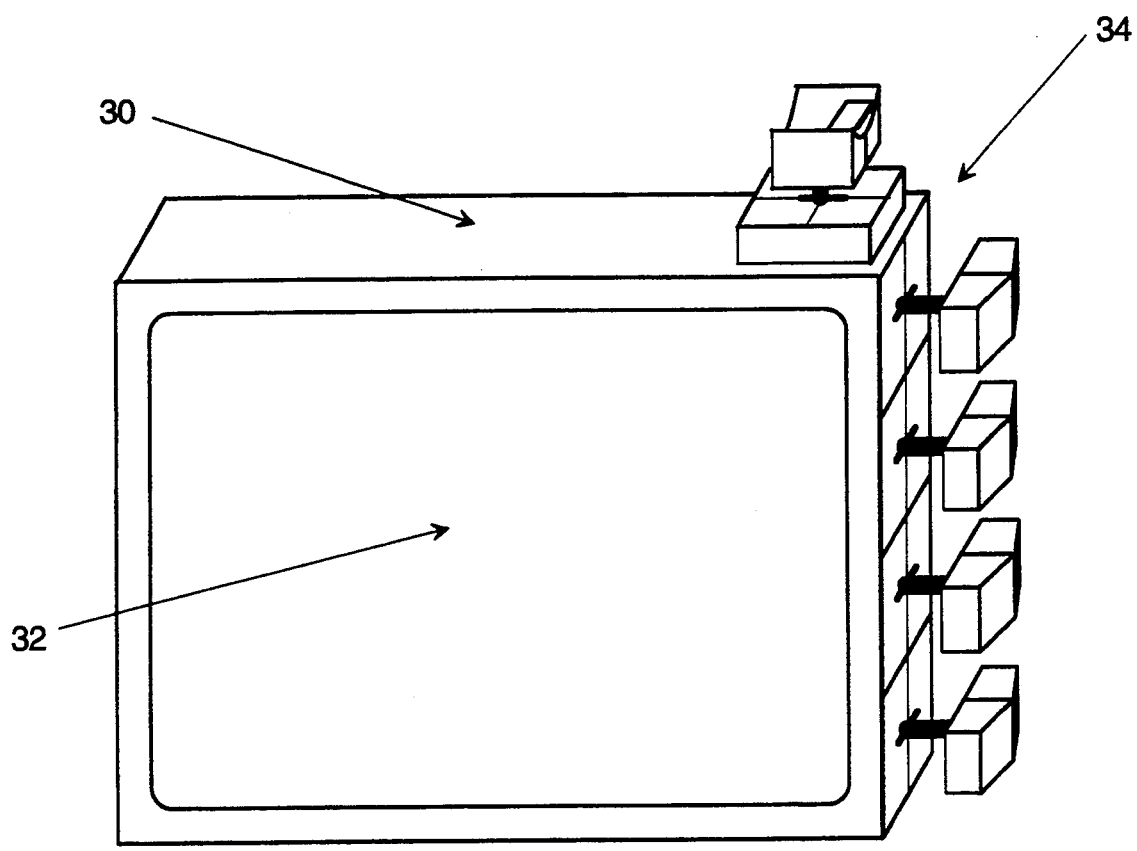
FIG. 11 depicts a full-screen display pocket-sized data-processing equipment according to this invention.

FIG. 11 depicts a full-screen display pocket-sized data-processing system 30 according to this invention. The invention is packaged together with a display device 32 with the keyboard 34 being connected or mounted onto the side of the housing. This allows the display 32 to cover the entire front. This embodiment can use the following technologies: liquid-crystal display, plasma panel, or thin-film transistor. It can be seen that this aspect of the invention enables the development of full-screen pocket text-handling devices, such as terminals, word-processors, and symbolic calculators.

Figure 12:
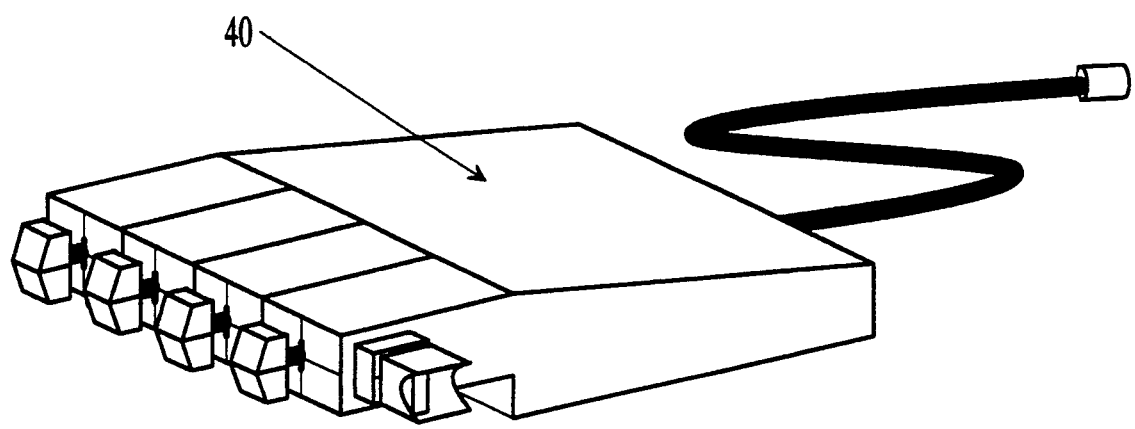
FIG. 12 depicts a one-hand keyboard arranged for desktop or portable use according to this invention.

FIG. 12 depicts a stand-alone single-hand keyboard 40 for desktop or portable use according to the invention.

Figure 13:
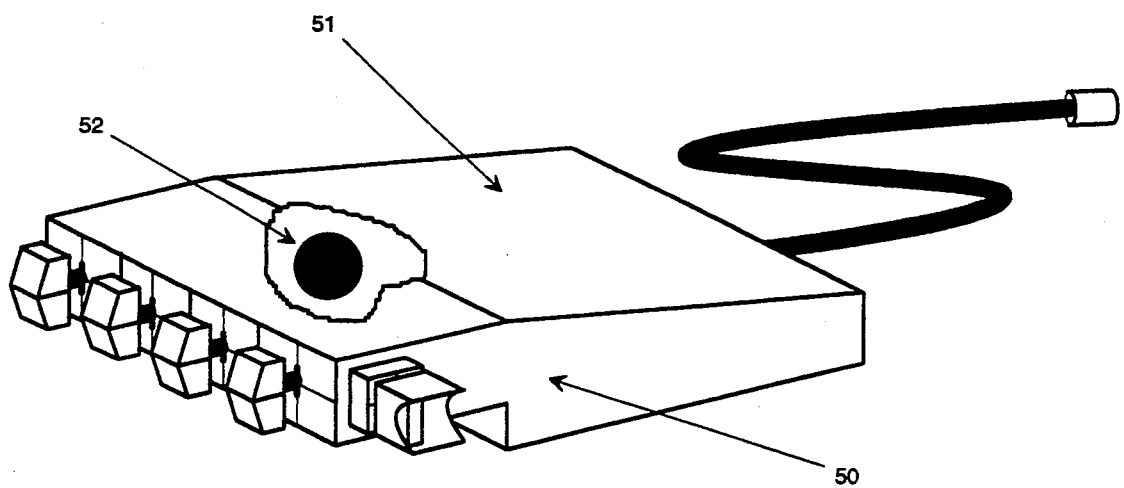
FIG. 13 depicts a point and type device contemplated according to this invention.

FIG. 13 depicts a point and type device according to this invention. The keyboard 51 is packaged with a mechanical or optical mouse with the usual roller-ball 52 which allows simultaneous pointing of a cursor and typing.

Figure 14:
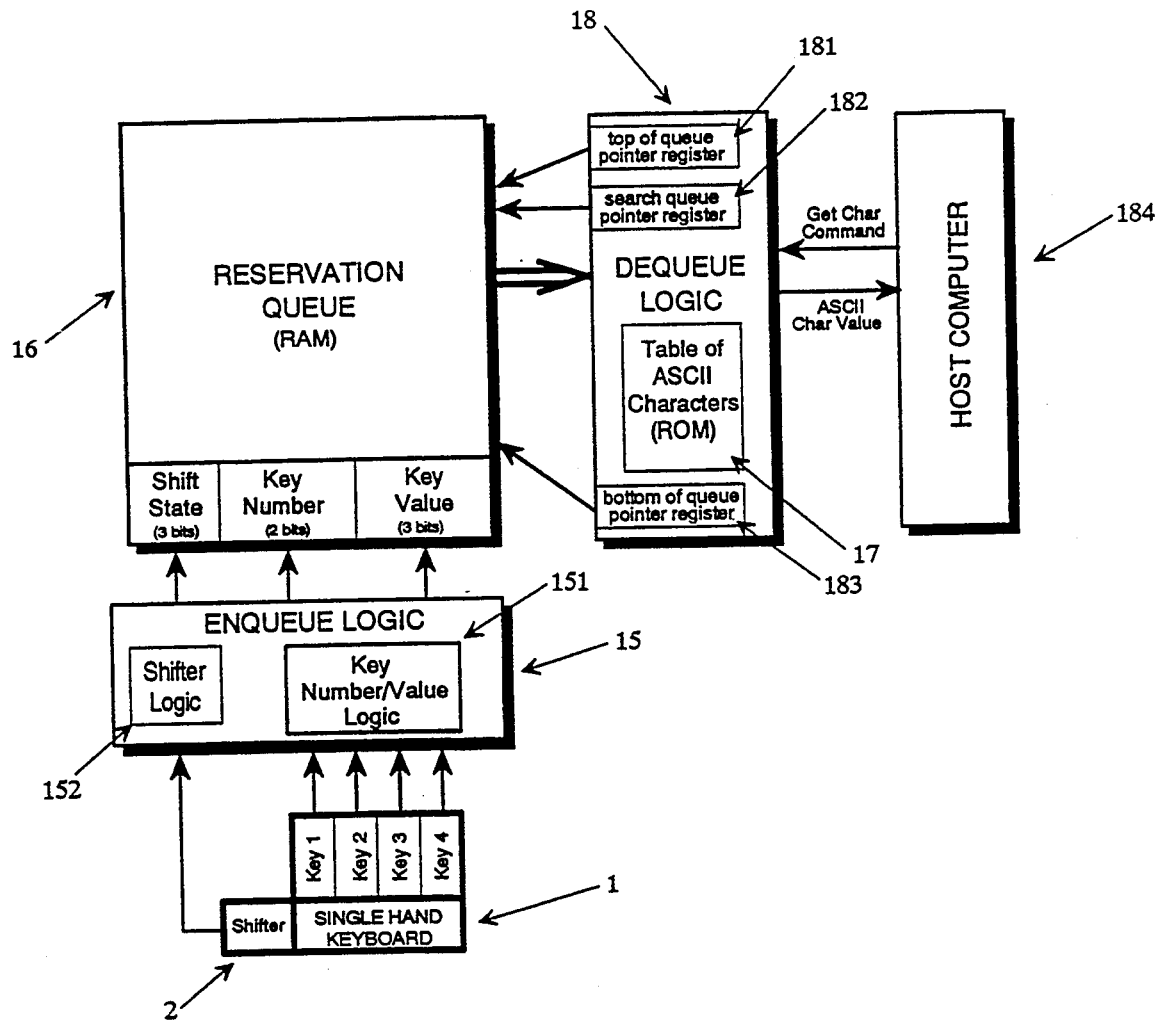
FIG. 14 is a block diagram of the reservation queue of FIG. 10.
Figure 15:
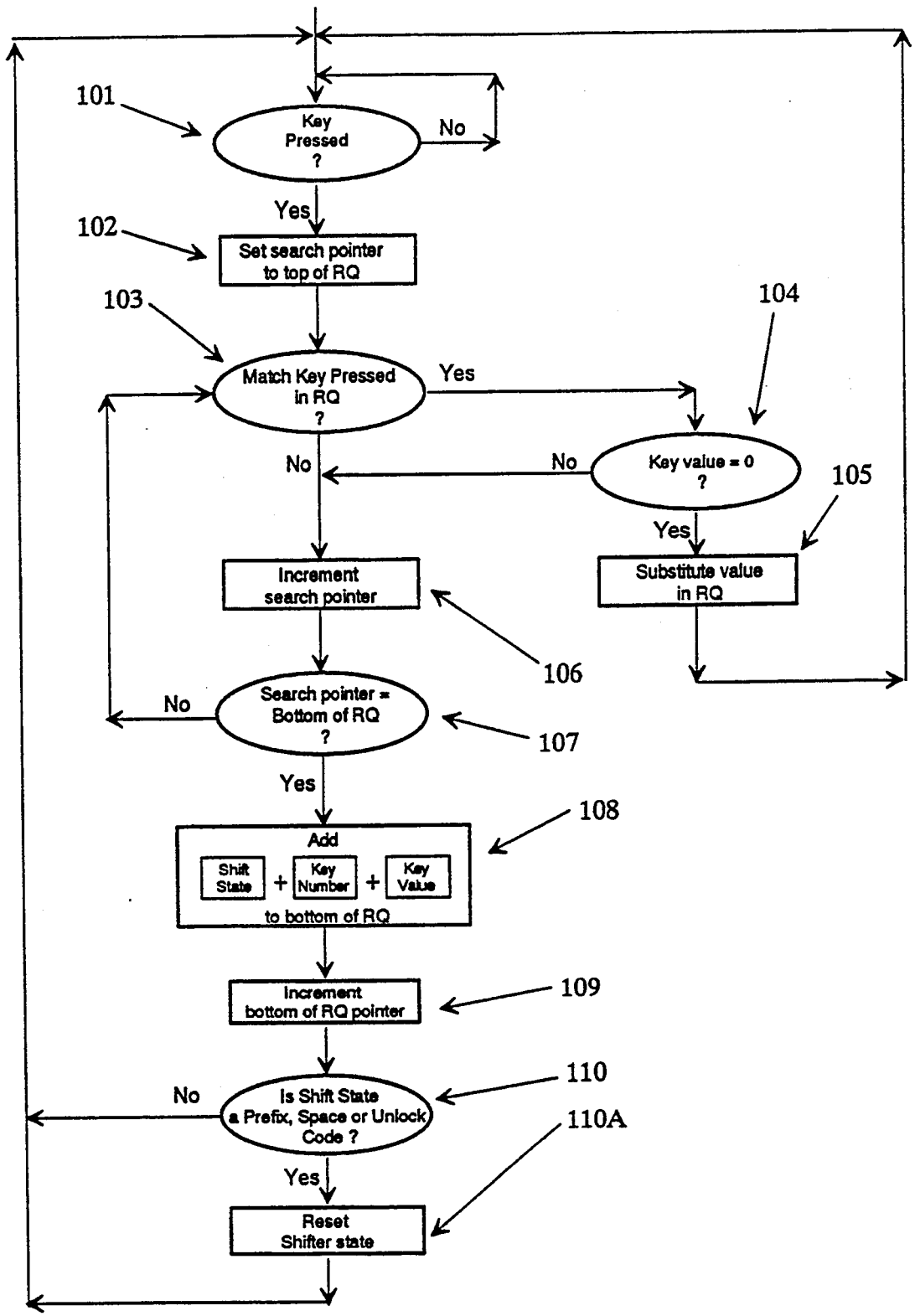
FIGS. 15 and 16 are flow charts of the logic of the reservation queue of FIG. 14.
Figure 16:
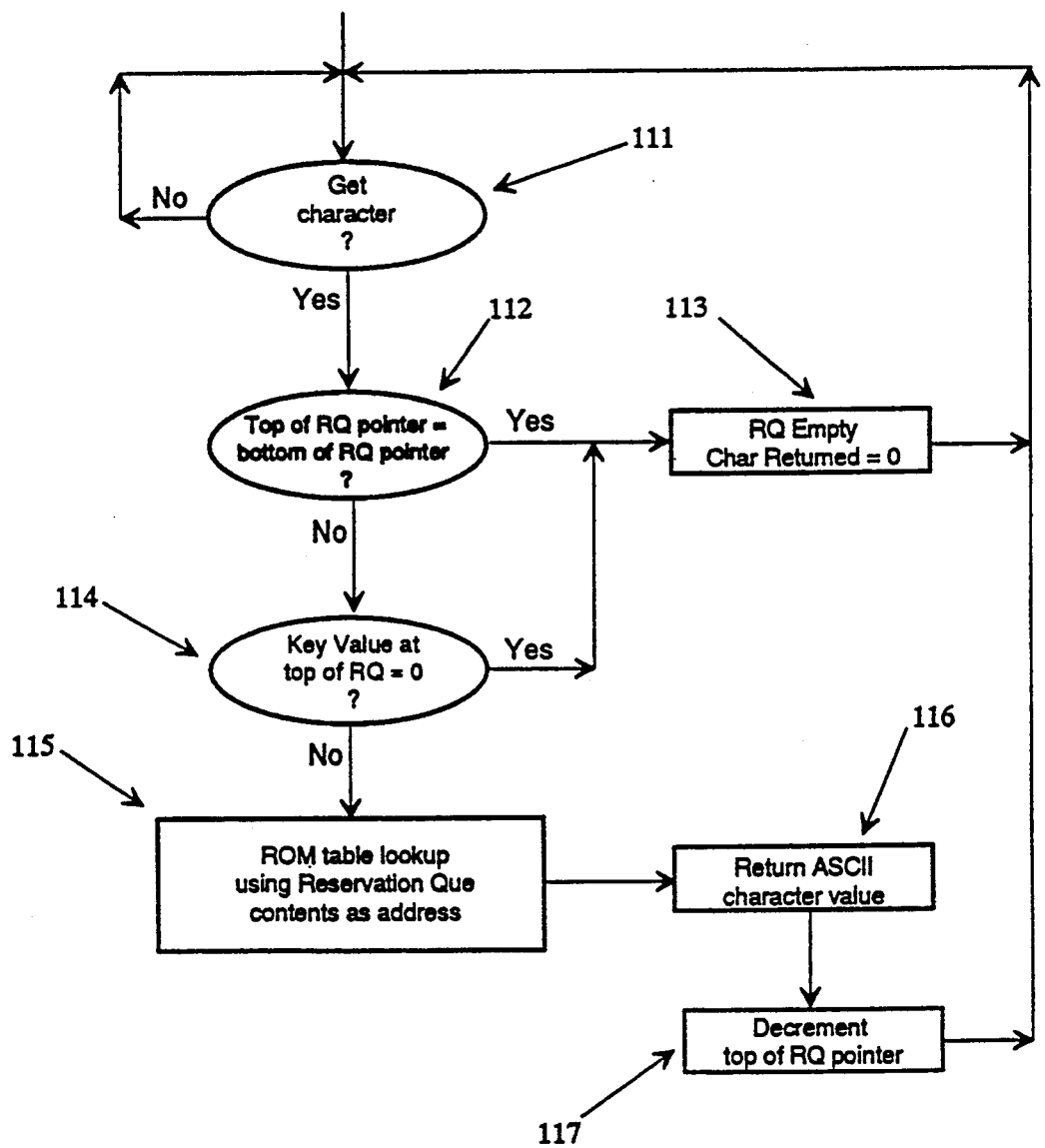

FIG. 14-16 relate to the reservation queue referred to in FIG. 10. A queue is a widely practiced technique comprised of a first-in-first-out memory list which is used to sequentially order data words arriving asynchronously from several data sources in order to present the words sequentially to a data sink. In practice, a queue is a random access memory combined with two pointers called top and bottom. When a word arrives at a queue, it is inserted into the memory position indicated by the bottom pointer, which is incremented. The receiving process fetches the word in the memory location indicated by the top pointer, which is incremented.

The reservation queue 16 according to the invention is a modification of a queue to handle the case in which the data sources need to reserve locations in the queue before they know what data word they wish to place there. This is a general modification of the data structure, with a preferred embodiment for this invention, in order to allow rapid typing though rollover. When a switch is moved from home position, it reserves a location, and when a switch emits a character, the queue is first searched for reservations for that switch. Reserved locations are not allowed to be dequeued until they are filled.

As shown in FIG. 14, each memory element in the queue comprises three fields, the shift-state, the key-number, and the key-value. In the preferred embodiment, the shift-state field holds a 3-bit binary code generated by the thumb switch, the key-number field holds a 2-bit binary code indicating which of the 4 keys is being represented, and the key-value field holds a 3-bit number indicating which of the 7 characters has been emitted. In the case when a reservation has been made, a special reserved code ("000") is stored in this field.

As shown, the queue is a RAM which holds a finite number of 8 bit words and has a top of queue pointer register 181 and a bottom of queue pointer register 183 associated therewith. When a word is applied to the queue, the bottom register 183 is incremented and when the receiver removes a word from the queue, it increments the top register 181. Data words are applied to a receiver which is ROM 17.

As shown in FIG. 14, the shift state which is 3 bits generated by the shifter logic 152 as shown in FIG. 8, the key-number which is a 2 bit code generated by the logic 151 and which identifies which of the four symbol keys has been pressed, and a 3 bit key-value which corresponds to the values shown in FIG. 5 and which is also generated by the logic 151.

FIG. 15 shows the logic sequence for character addresses to be enqueued in the reservation queue 16. As shown in step 101, if a key is pressed, a search pointer register 182 is set to the top of the reservation queue in step 102. Thereafter, the search queue pointer register 182 is used to incrementally search the queue for an element whose key-number matches the current key, and whose key value is 000 (reserved). If yes, and the key value is zero, the value is substituted in reservation queue in steps 104 and 105. If not, then the search pointer register 182 is incremented in step 106. After incrementing the search pointer, if the search pointer is not equal to the bottom of the reservation queue as determined by the register 183 in step 107, the logic looks to see if the current key pressed matches the key stored in the reservation queue. This procedure continues until the search pointer is at the bottom of the reservation queue. At that point, if no match is found the 8 bits of the character code are added to the bottom of the reservation queue in step 108 and the bottom of the reservation queue pointer register 183 is incremented in step 109. If there is a prefix, space or unlock code from the shift-state in step 110, then the shifter logic state of shifter logic 152 is reset in step 110A and the logic awaits the next key pressed.

FIG. 16 shows the logic related to obtaining a character address from the reservation queue under the control of the computer 184. The computer first issues a get character command and when this is received at step 111, the logic looks to see if the top of the queue pointer register 181 equals the bottom of the queue pointer register 183. If so, then the reservation queue is empty and the character "0" is returned at step 113. If not, the logic looks to see the contents of the key-value field at the top of the reservation queue If this value is "0" then a "0" is returned. If not, the ROM table look-up 17 uses the reservation queue character address from step 115 to return the corresponding ASCII character value in step 116. Thereafter the top of the queue pointer register 181 is decremented in step 117.

Figure 17:
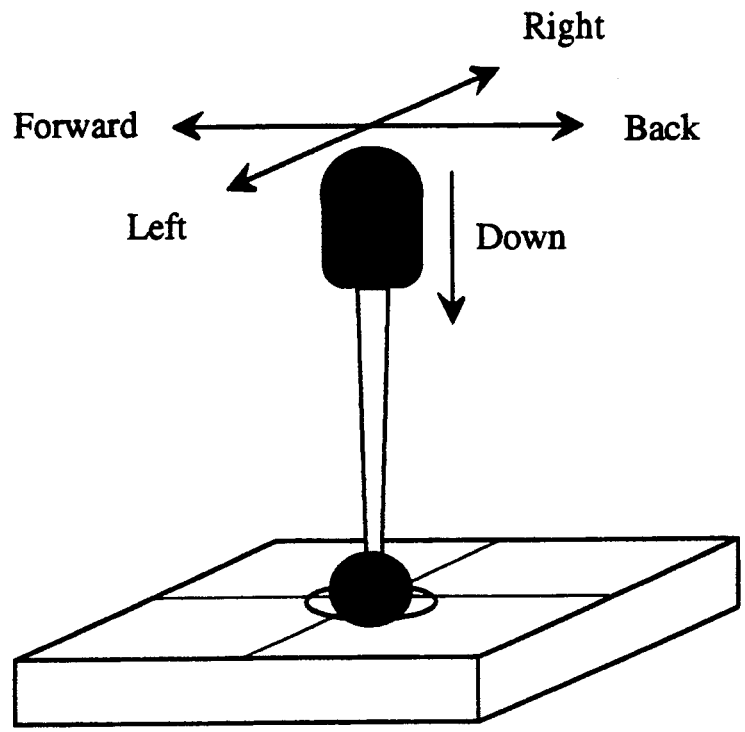
FIG. 17 is an illustration of another key switch according to the present invention.
Figure 18:
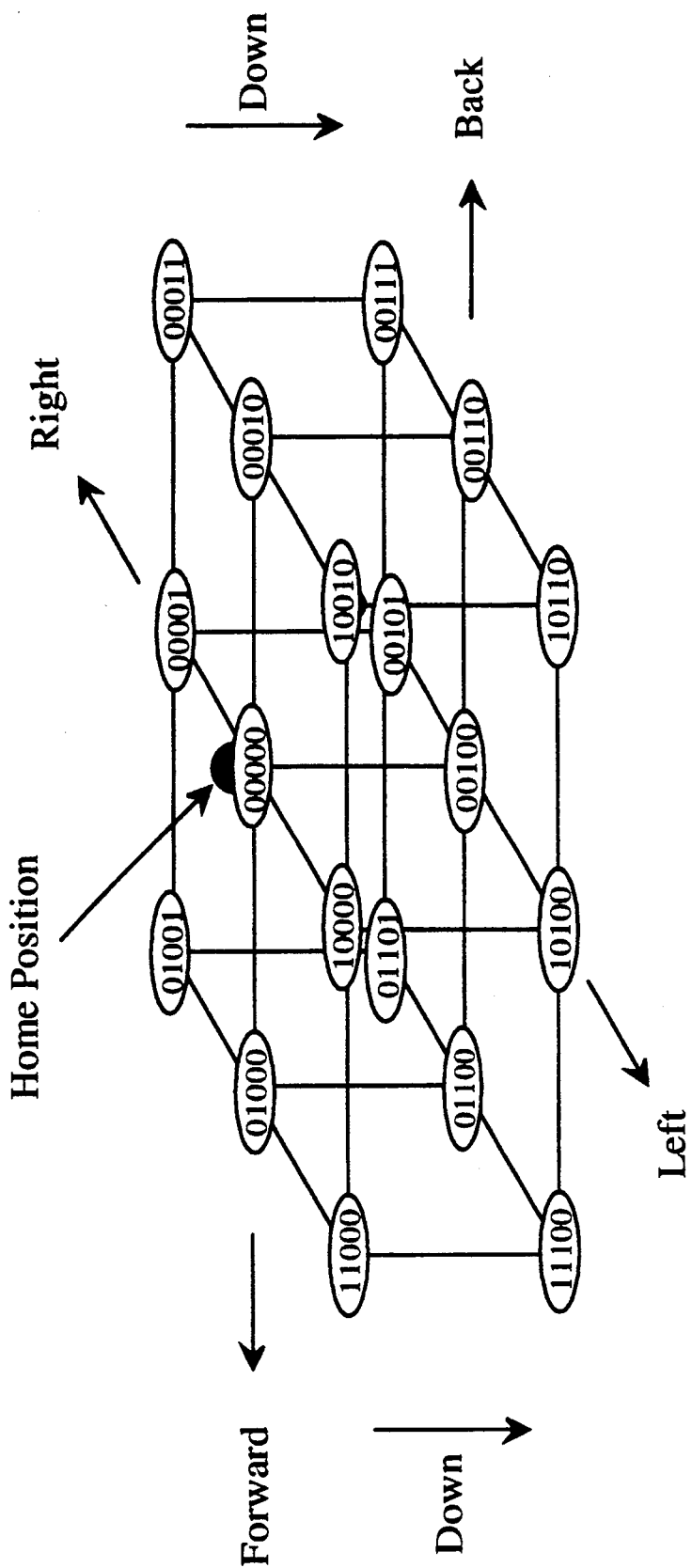
FIG. 18 is a three dimensional view of the states of the keyswitch of FIG. 17.

Another embodiment of the invention comprises at least one keyswitch capable of moving in one of five possible directions in three dimensions. As shown in FIG. 17, the keyswitch can be moved from the home position forward, back, down, left and right. This switch can be implemented in the form of a joystick movable in two axes with a depressible grip or handle as shown. As shown in FIG. 18, this switch is movable from the home state to one of 17 other states located at the vertices, centers and edges of a 3×3×2 rectangular solid. Each of the 18 switch positions is represented by a unique binary value which signifies its location relative to the home position. A "1" in the leftmost place indicates a location to the left of the home position, a "1" in the rightmost place indicates a location to the right of the home position, a "1" in the second place from the left indicates a location forward of the home position, a "1" in the second place from the right indicates a location behind the home position and a "1" in the center place indicates a location down or below the home position. For example, the digits 01101 indicate a position forward, down and to the right of the home position.

Figure 19A:
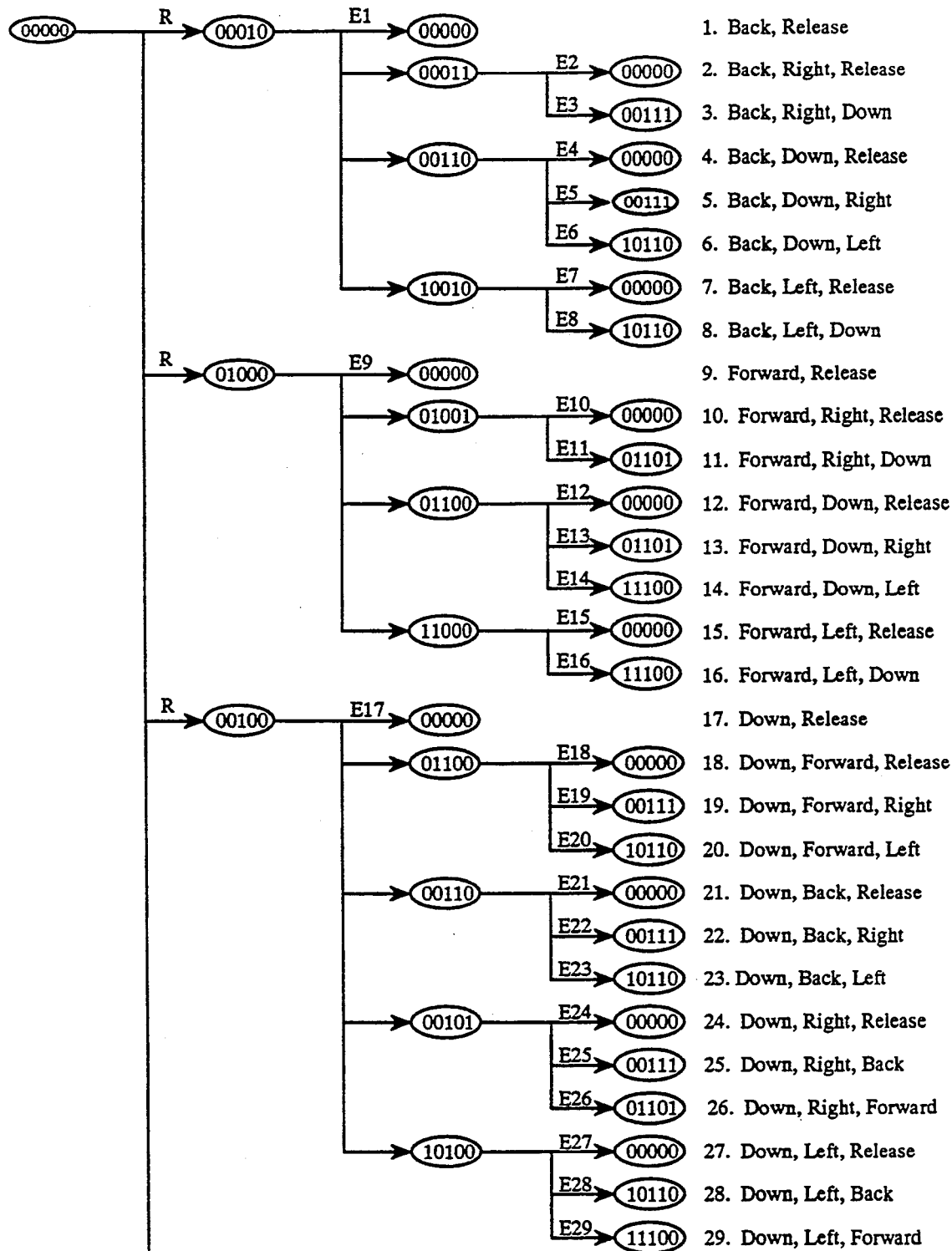
FIG. 19A and 19B is a state transition diagram for the keyswitch of FIG. 17.
Figure 19B:
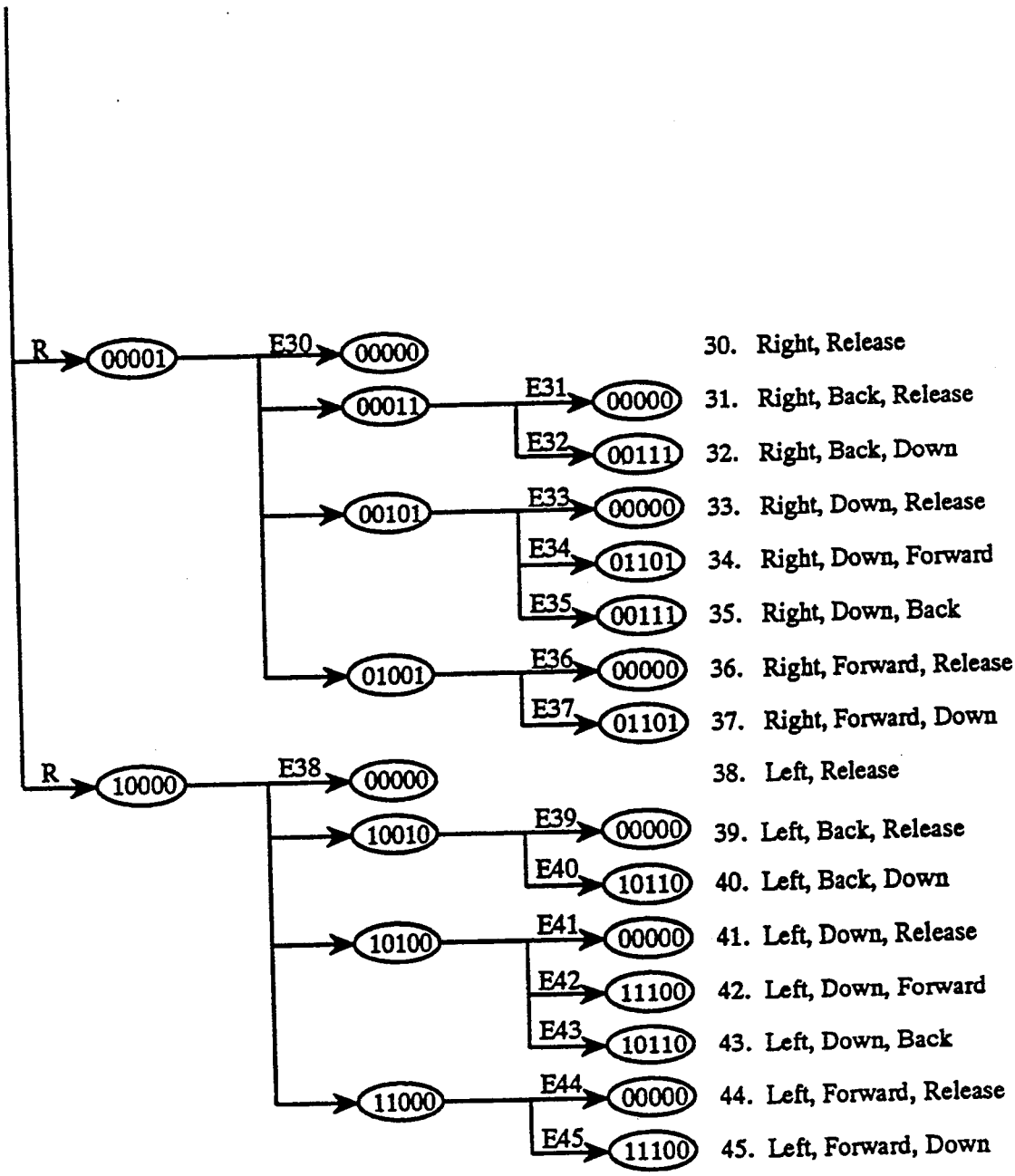

FIG. 19A and 19B illustrates the paths consisting of up to three state transitions that can be taken from the home position. As shown, 45 unique characters or symbols can be represented using this encoding scheme with a single switch.

It is understood that the embodiments described in detail and by diagram are for the purposes of illustration and concentrate on a single system. The invention clearly has many variants, and the variants which fall within the spirit and scope of this invention are defined by the following claims.

What is claimed is:

1. A data input device for producing signals corresponding to symbols, comprising:

at least two manually actuatable switches, each manually actuatable switch having a plurality of discrete states and manually actuatable along a first path from a given state to a first state selected from a set of first states at one state transition from the given state, and manually actuatable along a second path from the first state to a second state selected from a set of second states at one state transition from the first state;

means for producing a first signal corresponding to the first path from the given state to the first state, means for storing the first signal, means for producing a second signal corresponding to the second path from the first state to the second state output means for producing an output signal representing one symbol in response to at least the sequence in time of the stored first signal and second signal and based upon said first and second paths associated with two consecutive state transitions of a switch between the three states consisting of the given state, the first state and the second state, said output means having reservation queuing means for effecting the production of output signals in an order based on the order of production of the first signals from each switch, said reservation queuing means comprising means for receiving the first and second signals from the switches in the order produced, a storage queue, means for reserving a location in the storage queue based solely on the order of receipt of a first signal from a switch, means for receiving the second signal from each switch with its associated first signal and storing said one symbol in the corresponding reserved storage queue location, and means for producing the output signals by sequentially accessing symbols stored in the storage queue.

2. The device according to claim 1, comprising a plurality of said manually actuatable switches, each constituting a symbol switch and further comprising a control switch for producing a third signal and wherein the output means comprises means for producing the output signal representing one symbol in response to first and second signals from one symbol switch and the third signal from the control switch.

3. The device according to claim 2, wherein the actuation of any switch and the production of its first and second signals can overlap in time with the actuation and signal production of any other switch and the output means further comprises reservation queuing means for effecting the production of output signals in an order based solely on the order of production of first signals from each switch, said reservation queuing means comprising means receptive of the first and second signals from the switches in the order produced, means for joining the first and second signals from each switch and means for determining the order of production of the output signals based solely on the order of production of the first signals from each switch.

4. The device of claim 2, wherein the control switch is a thumb switch having a plurality of positions and operable for generating a plurality of different third signals.

5. The device of claim 1, comprising a plurality of said manually actuatable switches.

6. The device of claim 5, comprising four switches.

7. The device of claim 5, wherein each switch is mechanically operable for responding to movements of a fingertip.

8. The device of claim 5, wherein each switch has six positions generally arranged at points in a 2×3 matrix of points, the rest position being at a point other than a vertex of the matrix.

9. The device of claim 5, wherein said switches are arranged relative to each other and assigned alphabetical symbols corresponding to paths such that the groups of alphabetical symbols produced by said switches for corresponding paths represents mnemonic groups of letters.

10. A computer system comprising the device of claim 1.

11. The system according to claim 10, comprising a plurality of said manually actuatable switches, each constituting a symbol switch and further comprising a control switch for producing a third signal and wherein the output means comprises means for producing the output signal representing one symbol in response to first and second signals from one symbol switch and the third signal from the control switch.

12. The device according to claim 11, wherein the actuation of any switch and the production of its first and second signals can overlap in time with the actuation and signal production of any other switch and the output means further comprises reservation queuing means for effecting the production of output signals in an order based solely on the order of production of first signals from each switch, said reservation queuing means comprising means receptive of the first and second signals from the switches in the order produced, means for joining the first and second signals from each switch and means for determining the order of production of the output signals based solely on the order of production of the first signals from each switch.

13. A word processor comprising the device of claim 1.

14. A full-scale display pocket-sized data-processing system comprising a housing and the device of claim 1.

15. The system of claim 14, wherein said device is connected to a side of said housing to enable the display to cover the entire front of the said housing.

16. The device of claim 1, wherein each at least one manually actuatable switch is manually actuatable along a third path from the second state to a third state selected from a set of third states at one state transition from the second state, wherein the means for producing the first and second signals has means for producing a third signal corresponding to the third path from the second state to the third state and means for storing the third signal and wherein the output means has means for producing an output signal representing one symbol in response to at least the sequence in time of the stored first, second and third signals and based upon the path associated with three consecutive state transitions of the switch between the four states consisting of the given state, the first state, the second state and the third state and whereby the third state constitutes the given state for the next first signals to be produced.

17. A data input method for producing signals corresponding to symbols, comprising the steps of:
manually actuating at least one of two manually actuatable switches, each switch having a plurality of discrete states along a first path from a given state to a first state selected from a set of first states at one state transition from the given state to produce a first signal corresponding to the first path from the given state to the first state;
storing the first signal;
reserving a location in a reservation storage queue based solely on the order of production of the first signal form each switch;
manually actuating said manually actuatable switches along a second path from the first state to a second state selected from a set of second states at one state transition from the first state to produce a second signal corresponding to the second path from the first state to the second state;
receiving the second signal from each switch with its associated first signal to produce and output signal representing one symbol in response to at least the sequence in time of the first and second signals and based upon said first and second paths associated with two consecutive state transitions of the switch;
storing said one symbol in the corresponding reservation storage queue location reserved by the first signal; and
producing output signals by sequentially accessing symbols stored in the reservation storage queue.

18. The method according to claim 17, comprising manually actuating a plurality of said switches, each constituting a symbol switch and manually actuating a control switch to produce a third signal and wherein the step of producing the output signal representing one symbol comprises producing the output signal in response to first and second signals from each symbol switch and the third signal from the control switch.

19. The method according to claim 18, wherein the actuation of any switch and the production of its first and second signals can overlap in time with the actuation and signal production of any other switch and the step of producing an output signal further comprises effecting the production of output signals in an order based solely on the order of production of first signals from each switch by receiving the first and second signals from the switches in the order produced, joining the first and second signals from each switch and determining the order of production of the output signals based solely on the order of production of the first signals from each switch.

20. The method of claim 17, wherein the steps of actuating comprise mechanically moving with a fingertip.

21. The method of claim 17, further comprises the steps of:
manually actuating the at least one manually actuatable switch along a third path from said second state to a third state selected from a set of third states at one state transition from the second state to produce a third signal corresponding to the third path; and
wherein the step of producing an output signal comprises producing a signal representing one symbol in response to at least the sequence in time of the first, second and third signals.

22. A data input device for producing signals corresponding to symbols, comprising:
at least two actuatable switches, each independently actuatable from a given state to an end state through at least two state transitions and wherein actuation of one switch can overlap in time with the actuation of any other switch;
means for producing for each switch at least first and second signals associated with a first and second state transition of the switch;

means receptive of the first and second signals from each switch in time sequence, wherein reception of a second signal from any switch need not be received prior to the reception of the first or second signals from any other switch; and output means for producing output signals representing symbols in response to at least the first and second signals from each switch, said output means comprising reservation queuing means for effecting the production of output signals in an order based solely on the order of production of the first signals from each switch, said queuing means comprising means receptive of the signals from the switches in the order produced, a first-in/first-out storage queue, means for reserving a location in the storage queue based solely on the order of receipt of a first signal from a switch, means for joining the second signal from each switch with its associated first signal in the corresponding reserved queue location and means for producing the output signals by sequentially accessing, on a first-in/first-out basis, joined signals stored in the queue which are not preceded by a reserved queue location.

23. The device of claim 22, comprising a plurality of switches.

24. The device of claim 23, wherein said switches are arranged relative to each other and assigned alphabetical symbols corresponding to paths such that the groups of alphabetical symbols produced by said switches for corresponding paths represent mnemonic groups of letters.

25. A data input method for producing signals corresponding to symbols, comprising the steps of:

independently actuating at least two actuable switches each from a given state to an end state through at least two state transitions and wherein actuation of one switch can overlap in time with the actuation of any other switch;

producing for each switch at least first and second signals associated with a first and second state transition of the switch;

providing a first-in/first-out storage queue receptive of the first and second signals from each switch in time sequence, wherein reception of a second signal from any switch need not be received prior to the reception of the first and second signals from any other switch; and producing output signals representing symbols in response to at least the first and second signals from each switch by effecting the production of output signals in an order based solely on the order of production of the first signals from each switch, comprising receiving the signals from the switches in the order produced, reserving a location in the storage queue based solely on the order of receipt of a first signal from a switch and joining the second signal from each switch with its associated first signal in the corresponding reserved queue location for producing the output signals by sequentially accessing, on a first-in/first-out basis, joined signals stored in the queue and which are not preceded by a reserved queue location.

26. A data input device for producing signals corresponding to symbols, comprising:

at least one manually actuatable switch having a given state, and manually actuatable from the given state, through a single change in state, to a first state selected from a set of possible first states, and manually actuatable from the first state, through a single change in state, to a second state selected from a set of possible second states;

means for producing a first signal encoding the given and first states upon detection of the first state transition that occurs in going from the given state to the first state, means for storing the first signal, means for producing a second signal encoding the first and second states upon detection of the second state transition that occurs in going from the first state to the second state;

output means for producing an output signal representing one symbol in response to at least the sequence of first and second signals encoding the three states associated with two consecutive state transitions of the switch, said output means having reservation queuing means for effecting the production of output signals in an order based on the order of production of the first signals from each switch, said reservation queuing means comprising means for receiving the first and second signals form the switches in the order produced, a storage queue, means for reserving a location in the storage queue based solely on the order of receipt of a first signal from a switch, means for receiving the second signal from each switch with its associated first signals and storing said one symbol in the corresponding reserved storage queue location, and means for producing the output signals by sequentially accessing the symbols stored in the storage queue.

27. The device according to claim 26, further comprising:

a manually actuable control switch for producing a third signal, and output means further comprising means for producing an output signal in response to at least said third signal and the sequence of stored first and second signals.

28. A plurality of symbol switch devices according to claim 27, wherein each symbol switch produces a set of output signals corresponding to a unique set of symbols.

29. The device according to claim 28, wherein said third signal utilized by each symbol switch is produced by a single, common control switch.

30. The device according to claim 29, wherein actuation of any symbol switch and its production of signals can overlap in time with the actuation of any other symbol switch and its signal production, and further comprising;

means receptive of the first and output signals from each symbol switch wherein reception of an output signal from any symbol switch need not be received prior to the reception of the first signal or output signal from any other switch; and output means for effecting the production of output signals from the plurality of symbol switches in an order based solely upon the order of reception of the first signals from each symbol switch, said output means comprising reservation queuing means receptive of the first and output signals from the symbol switches in the order in which they are produced, a first-in/first-out storage queue, means for reserving a location in the storage queue for a pending symbol switch output signal upon reception of the symbol switch first signal, means for placing the output signal of a symbol switch in the queue location reserved for it by the symbol switch first signal, and means for producing output signals corresponding to symbols by sequentially accessing, on a first-in/first-out basis, symbol switch output signals stored in the queue which are not preceded by a reserved queue location.

* * * * *